(12) United States Patent
Schwulst et al.

(10) Patent No.: US 7,225,793 B2
(45) Date of Patent: Jun. 5, 2007

(54) ENGINE TIMING CONTROL WITH INTAKE AIR PRESSURE SENSOR

(75) Inventors: Kyle E. E. Schwulst, Whitmore Lake, MI (US); Tamas I. Pattantyus, Ann Arbor, MI (US)

(73) Assignee: Electrojet, Inc., Whitmore Lake, MI (US)

( * ) Notice: Subject to any disclaimer, the term of this patent is extended or adjusted under 35 U.S.C. 154(b) by 0 days.

(21) Appl. No.: 11/276,086

(22) Filed: Feb. 14, 2006

(65) Prior Publication Data

US 2006/0118086 A1  Jun. 8, 2006

Related U.S. Application Data

(63) Continuation-in-part of application No. PCT/US2004/026093, filed on Aug. 12, 2004, which is a continuation-in-part of application No. 10/642,530, filed on Aug. 14, 2003, now Pat. No. 6,804,997.

(51) Int. Cl.
*F02P 5/10* (2006.01)

(52) U.S. Cl. ............... 123/406.47; 123/406.22; 123/406.42; 701/105; 73/118.2

(58) Field of Classification Search ........... 123/406.22, 123/406.41, 406.42, 406.47; 73/116, 118.1, 73/118.2; 701/105
See application file for complete search history.

(56) References Cited

U.S. PATENT DOCUMENTS

| | | | |
|---|---|---|---|
| 3,931,802 A | 1/1976 | Eckert | |
| 4,557,225 A | 12/1985 | Sagues et al. | |
| 4,766,869 A | 8/1988 | de Concini et al. | |
| 4,787,043 A | 11/1988 | Zimmerman et al. | |
| 4,972,818 A | 11/1990 | Nomura et al. | |
| 4,986,242 A | 1/1991 | Bonfiglioli et al. | |
| 5,092,301 A | 3/1992 | Ostdiek | |
| 5,094,212 A | 3/1992 | Kawaguchi et al. | |
| 5,107,813 A * | 4/1992 | Inoue et al. ........... | 123/406.22 |
| 5,206,809 A | 4/1993 | Iwakiri et al. | |
| 5,321,979 A | 6/1994 | McKendry et al. | |
| 5,367,462 A | 11/1994 | Klenk et al. | |
| 5,568,794 A | 10/1996 | Tabuchi et al. | |

(Continued)

FOREIGN PATENT DOCUMENTS

WO  200519623 A2  3/2005

*Primary Examiner*—Erick Solis
(74) *Attorney, Agent, or Firm*—Brooks Kushman P.C.

(57) ABSTRACT

An engine control apparatus is disclosed for determining crankshaft position and engine phase of an internal combustion engine through monitoring intake air pressure fluctuations. The opening of the intake valve is mechanically linked to the crankshaft position of an engine. When the intake valve opens it creates air pressure fluctuations in the air induction system of the engine. The control apparatus is configured to determine intake air pressure fluctuations indicative of an intake air event and thus a particular crankshaft position, and their corresponding period of the engine cycle. The controller then uses this information to determine crankshaft speed and position for the purpose of fuel injection and ignition timing of the internal combustion engine. Engine phase is also determined on four-stroke engines. The engine may also include a crankshaft position sensor in combination with monitoring intake air pressure fluctuations to increase resolution in determination of crankshaft position. A circuit is provided for simultaneously measuring intake temperature using a single bridge type pressure sensor in order to calculate air mass flow rate.

29 Claims, 7 Drawing Sheets

U.S. PATENT DOCUMENTS

| | | |
|---|---|---|
| 5,988,119 A | 11/1999 | Trublowski et al. |
| 6,219,971 B1 | 4/2001 | Headrick |
| 6,286,492 B1 | 9/2001 | Kanno |
| 6,340,020 B2 | 1/2002 | Yamazaki et al. |
| 6,352,065 B1 | 3/2002 | Wild et al. |
| 6,453,897 B1 | 9/2002 | Kanno |
| 6,557,528 B2 * | 5/2003 | Hiltner ............ 123/406.42 |
| 6,636,796 B2 | 10/2003 | Kolmanovsky et al. |
| 6,640,777 B2 | 11/2003 | Enoyoshi et al. |
| 6,665,989 B2 | 12/2003 | Bennett |
| 6,804,997 B1 | 10/2004 | Schwulst |
| 6,866,027 B1 | 3/2005 | Marchesini et al. |
| 7,020,554 B2 * | 3/2006 | Roduner et al. ............ 701/105 |
| 2001/0025625 A1 | 10/2001 | Schneider |
| 2002/0170346 A1 | 11/2002 | Shimoyama |
| 2003/0168028 A1 | 9/2003 | Isoda et al. |
| 2003/0221480 A1 | 12/2003 | Aschner et al. |

* cited by examiner

ENGINE TIMING CONTROL WITH INTAKE AIR PRESSURE SENSOR

CROSS-REFERENCE TO RELATED APPLICATIONS

This application is a continuation-in-part of PCT application No. PCT/US/2004/026093 filed Aug. 12, 2004, which, in turn, claims priority to U.S. Pat. No. 6,804,997 which issued on Oct. 19, 2004.

BACKGROUND OF THE INVENTION

1. Field of the Invention

The present invention is directed to an intake air pressure sensor assembly for an internal combustion engine, and in particular, a fuel-injected engine that communicates with a controller for controlling the fuel injectors and ignition timing based on detected air pressure fluctuations.

2. Background Art

In all fields of engine design there is emphasis on fuel economy, engine performance, and most notably, engine-out emissions. Increased emissions restrictions have led to the necessity of a more accurate fuel metering process. Fuel injection systems have emerged as an accurate way to control the air and fuel mixture in an internal combustion engine and thus keep emissions low. The trend towards fuel injection has not been without added costs, and as such has limited the applications of this technology in price sensitive markets. To apply fuel injection to an engine, one must add an engine controller, a more complex fuel system, and multiple sensors. In addition, engines often need to be redesigned to allow for the application of these control electronics. All of these components add costs and complexity to the engine system. Many manufacturers simply cannot be competitive with the added costs of fuel injection in their product line, and as such are delaying its implementation until emissions regulations mandate its use. It would be ideal to have an accurate system for controlling an internal combustion engine that is less complex and less costly to implement on current engine technology.

A four-stroke engine must rotate two complete rotations for one full engine cycle. This cycle is comprised of the intake, compression, power, and exhaust strokes. The four-stroke cycle is based on a 720° cycle, or two complete rotations of the crankshaft. In relation to four-stroke engines, the engine phase determines which half of the 720° cycle the engine is on. For example, if a four-stroke engine is "in phase" on a 720° cycle, it is considered synchronous, and the engine controller can correctly determine which stroke the engine is on. If the four-stroke engine is not synchronous, the engine controller can only determine engine position on a 360° cycle. Many systems must determine engine phase to obtain the appropriate timing on four-stroke engines. A two-stroke engine must only rotate one complete rotation for a complete engine cycle. No phase information must be obtained from this engine cycle. This will be referred to as a 360° engine cycle.

Typically, a fuel injection system utilizes a plurality of sensors on the engine to determine engine operating conditions. For example, a fuel-injected engine may be equipped with a crankshaft position sensor, cam position sensor, intake air pressure sensor, and barometric air pressure sensor in addition to other sensors. The engine controller monitors these sensory inputs to determine the appropriate ignition timing, injection timing, and quantity of fuel to be injected. It would be beneficial to reduce the number of sensors necessary to operate an engine, yet maintain accurate control. This would result in fewer components, less complexity, and reduced costs.

One of the various types of data monitored by these sensory inputs to the engine controller is the determination of the intake air pressure. This measurement process can be quite complex. This challenge can be complicated further by monitoring intake air pressure in engines with few cylinders. It is well known in the art that intake pressures fluctuate with the opening and closing of the intake valves during the intake stroke. If there is a plurality of cylinders there will be more intake events per crankshaft rotation and traditionally less overall intake air pressure fluctuations. However, if few cylinders are present as in small engines, there will be fewer intake events per crankshaft rotation and large intake air pressure fluctuations will be apparent. If the average intake pressure were to be obtained, it will not be an accurate indication of actual cylinder intake air pressures due to these fluctuations.

Air pressure sensors have been used in the calculation of intake air mass seen by reference to U.S. Pat. No. 6,453,897 to Kanno. In this approach, the intake air pressure of the engine is sampled just once per engine crankshaft revolution. It is generally understood in the art that the air pressure can be used for intake air mass calculations in fuel injection control. Kanno presents a system that has increased accuracy for measuring intake air pressure and therefore increased accuracy in obtaining intake air flow rate and desired air/fuel ratio in the engine. This example presents no applications to determining engine phase or crankshaft position through the air pressure fluctuations. Instead, this approach strictly pertains to a single air pressure measurement at a predetermined crankshaft position. The timing of this measurement is determined through the use of a crankshaft position sensor and engine control unit.

In some applications, the mass air flow rate into the engine is estimated in part by measuring the absolute pressure within the induction manifold (Manifold Absolute Pressure, or "MAP"). A mass air flow rate is the mass of air drawn into an engine over a particular period of time. Air density, or mass per unit volume, is proportional to air temperature, pressure, and humidity of the air drawn into the engine. This data is used to calculate the mass air flow rate of the engine, or mass of the incoming air. Such calculations are known as volume-density or speed density calculations.

With crankshaft position measurement, a toothed wheel is typically used in conjunction with a pickup to detect positional movement. These devices are traditionally hall effect devices or variable reluctance devices. In automotive applications, the toothed wheel consists of multiple teeth or "timing slugs" evenly spaced on the crankshaft. The number of teeth is traditionally a whole divisor of 360°. As the number of teeth is increased, resolution of the system is increased. In many applications, there is a missing tooth to indicate a predetermined position on the crankshaft itself. An automotive standard of today is known as a "36-1" pattern. This pattern evenly spaces 36 gear teeth on a ring, and has one of the 36 teeth removed to indicate a predetermined angular position. From this input, engine rpm and crankshaft position can be directly measured. Unfortunately, the crankshaft rotates twice for a complete 720° cycle in four stroke engines. A crankshaft position sensor can not indicate engine phase on a four-stroke engine because of this. The crankshaft will be in the exact same position twice during the engine cycle. Additional sensory information is required to synchronize to a 720° cycle, if the engine controller is to operate in a synchronous manner. If the crankshaft is keyed to indicate its position, it is only possible to determine engine position based on 360° cycle, or a single crankshaft rotation without additional sensory information.

Many small engines utilize a crankshaft trigger mechanism for indicating a predetermined crankshaft position for ignition purposes. With this mechanism an ignition spark is emitted every 360° of crankshaft rotation. This type of system is similar to a crankshaft position sensor with the distinction of having only a single signal indicating pulse per crankshaft revolution. A system of this nature typically is not in communication with an engine control device, but is rather part of a stand-alone ignition system. As such, there is little or no memory from one cycle to the next. These systems cannot predict engine timing for fuel injection purposes due to crankshaft acceleration and deceleration. They can however consistently trigger an ignition system at a fixed crankshaft angular position.

To determine engine phase on four stroke engines, an additional sensor is typically used in conjunction with a crankshaft position sensor. A camshaft position sensor may be used to determine an engine's phase. The camshaft rotates at exactly half the speed of the crankshaft and they are mechanically linked. Therefore, these two sensory inputs provide the engine controller with engine position information to run on a synchronous basis to a 720° engine cycle. Due to its nature, a camshaft position sensor is not as accurate as a crankshaft position sensor and therefore they are typically used in combination.

In most applications, these are all discrete and separate sensors. Each sensor traditionally has only a single role in monitoring engine conditions. They each require their own wiring, connectors, and tooling to be mounted to the engine. These multiple parts all add in the cost of fuel injection implementation.

Additionally, if the crankshaft position sensor were to fail for any reason, little or no redundancy is implemented and the engine would cease to operate.

It would be advantageous to reduce the number of sensors necessary to run the engine. If this could be done, cost savings would be realized in fewer sensors, reduced tooling, reduced fixturing, reduced assembly time, and lower design costs. If fewer sensors were required to accurately control fuel injection timing, it would enable a more cost efficient transition of non-fuel injected engines to the technology.

Accordingly, several objects and advantages of my invention are the multiple uses of a single intake pressure sensor to control the timing of an internal combustion engine and measure intake air mass. This invention was designed for use on a single cylinder engine, but may be applicable to, but without limitation to, all forms of internal combustion engines exhibiting intake pressure fluctuations. This invention reduces the number of sensors necessary to determine engine timing and operating characteristics by monitoring intake pressure fluctuations.

To effectively time an engine, this invention can replace the crankshaft position sensor, cam position sensor, manifold air pressure sensor, and barometric pressure sensor with a single part. With this technology a single intake air pressure/temperature sensor could be used as a stand-alone mechanism for fuel metering and injection timing. By monitoring the intake pressure fluctuations, one would observe a vacuum pulse every two crankshaft rotations (in a four stroke engine, once per revolution in a two stroke engine). This is indicative of a particular crankshaft position and the time when the intake valve is open. When implemented with a microprocessor, the time interval between intake pressure events could be mathematically modeled to predict when the next event would occur. In addition, this model could offer a prediction of crankshaft position sub-cyclic to the intake pressure events. With this timing information, fuel metering and ignition timing could accurately and precisely be added to an engine in a non-intrusive form. No additional sensors need to be hard tooled or machined into the engine block material. This may be of specific benefit to companies that want to add fuel injection technology to an existing product. This system, while not having resolution as high as a "36-1" tooth crank position pick-up on an automobile engine, offers excellent accuracy at much lower costs.

Many small engines of today use some form of crankshaft trigger for their ignition system. If a crankshaft trigger or crankshaft position sensor input were combined with the technology of this patent, increased accuracy and resolution would be obtained in engine timing. Using a crankshaft trigger alone does not allow an engine to be timed on a 720° cycle (in four stroke applications). With the input of the intake pressure fluctuations in addition to a crankshaft trigger, and engine may be aligned in phase on a 720° cycle. When implemented with a microprocessor, the system can be mathematically modeled to predict and monitor intake pressure events. With this information, a much higher resolution can be obtained than in the previous example. With this timing information, fuel metering and ignition timing could accurately and precisely be added to an engine in a non-invasive form.

Redundancy is obtained in a system of this nature. If one of the two sensors were to fail, the other sensor would provide ample signal to enable the engine to continue to be operated, with reduced resolution. This may be a valuable benefit if the engine were to be placed into a vehicle where engine failure cannot be tolerated in the field.

Due to the location of the pressure sensor in the intake tract, this allows for engine manufacturing to be simplified. Tooling, engineering, and design time does not have to be invested in placement of multiple sensors in the engine castings. This control system specifically benefits manufacturers who may want to add fuel injection to an existing carbureted product. The non-invasive nature of this invention lends itself to applications in engines where tooling, packaging, or redesign costs are too high to consider standard fuel injection applications.

Further objects and advantages of my invention will become apparent from a consideration of the drawings and ensuing description.

SUMMARY OF THE INVENTION

A need therefore exists for a less complex fuel injection control system for cost sensitive applications. This invention presents a novel approach for a low cost, low complexity engine timing control for fuel injection applications. One aspect of the present invention is a method to reduce the complexity of the fuel injection system through using an intake air pressure sensor to determine engine position and phase and to determine air mass flow. Pressure fluctuations are present on the intake stroke of the engine and are mechanically related to the opening and closing of the intake valve. The movement of the intake valve is mechanically linked to the crankshaft angle and hence the timing of the engine. There is an intake event every two crankshaft rotations in four-stroke applications, and once every crankshaft rotation for two-stroke engines. The presence of these pressure fluctuations is therefore indicative of engine phase (in four stroke applications), crankshaft position, engine speed, and can directly measure engine rpm. With this information, crankshaft position can be quantitatively measured and engine timing can be determined from pressure fluctuations without the need for a crankshaft and camshaft position sensor.

This invention can be used as a stand alone engine timing mechanism, or in addition to a very simple crankshaft trigger/position sensor to accurately time an engine and distinguished between the intake and expansion strokes using intake pressure. This system offers less resolution than automotive "36-1" tooth crankshaft position sensors, yet offers excellent position sensing and engine timing at a much lower cost and complexity. The inherent non-invasive nature of this technology lends itself to be easily added to almost any pre-existing internal combustion engine configuration.

Thus, a manufacturer of engines would find it very easy to add the technology of fuel injection to their current product line. They would not need to hard tool or support multiple new sensors in their engine line. This invention allows for relative ease in the addition of fuel injection to engines not currently designed for the technology. The present invention allows for a low cost and extremely robust implementation of fuel injection on an internal combustion engine.

In one preferred embodiment of the invention, a pressure transducer is introduced in the intake system intermediate the throttle and the intake valve so that the pressure transducer is exposed to fluctuating pressure of the intake air with the temperature of the transducer being affected by the intake air temperature as well as the engine temperature. The pressure transducer is provided by four pressure sensitive variable resistors arranged in a wheatstone bridge such that the resistance across the post power terminal remains relatively constant while the resistance across the post intermediate terminals varies as a function of pressure. The variable resistors are temperature sensitive causing the resistance across opposed power terminal to vary as a function of temperature enabling the pressure sensor to serve over the pressure sensor and temperature sensor.

In a preferred embodiment of the invention, the engine controller concludes a pressure signal processing circuit which uses the intake pressure signal to develop at least one timing pulse per intake event to provide an indication of crankshaft angle positioned within the engine cycle with the time between sequential timing pulses providing an indication of engine speed. The pressure signal processing circuit further calculates air flow based upon the profile of a pressure signal without reference to the physical position of the intake throttle valve. The circuit calculates air flow based on a speed density calculation, which takes into account pressure, temperature, engine speed and load. The circuit calculates engine LOAD without reference to throttle position. This embodiment enables conventional carbureted engines to be inexpensively converted to electronically controlled fuel injection with relatively few modifications of the intake system. In a preferred embodiment of the invention, a pressure sensing element can be directly mounted on to a circuit board containing the electronic engine control circuitry and the circuit board can be mounted directly upon the engine intake with the pressure sensor in communication with a pressure passage coupled to the intake port intermediate the throttle and intake valve. The resulting packaging achieves a very compact, efficient structure facilitating the conversion of existing carbureted engines to electronic fuel injection with minimal hardware changes.

DRAWINGS—REFERENCE NUMERALS

Figure 1:
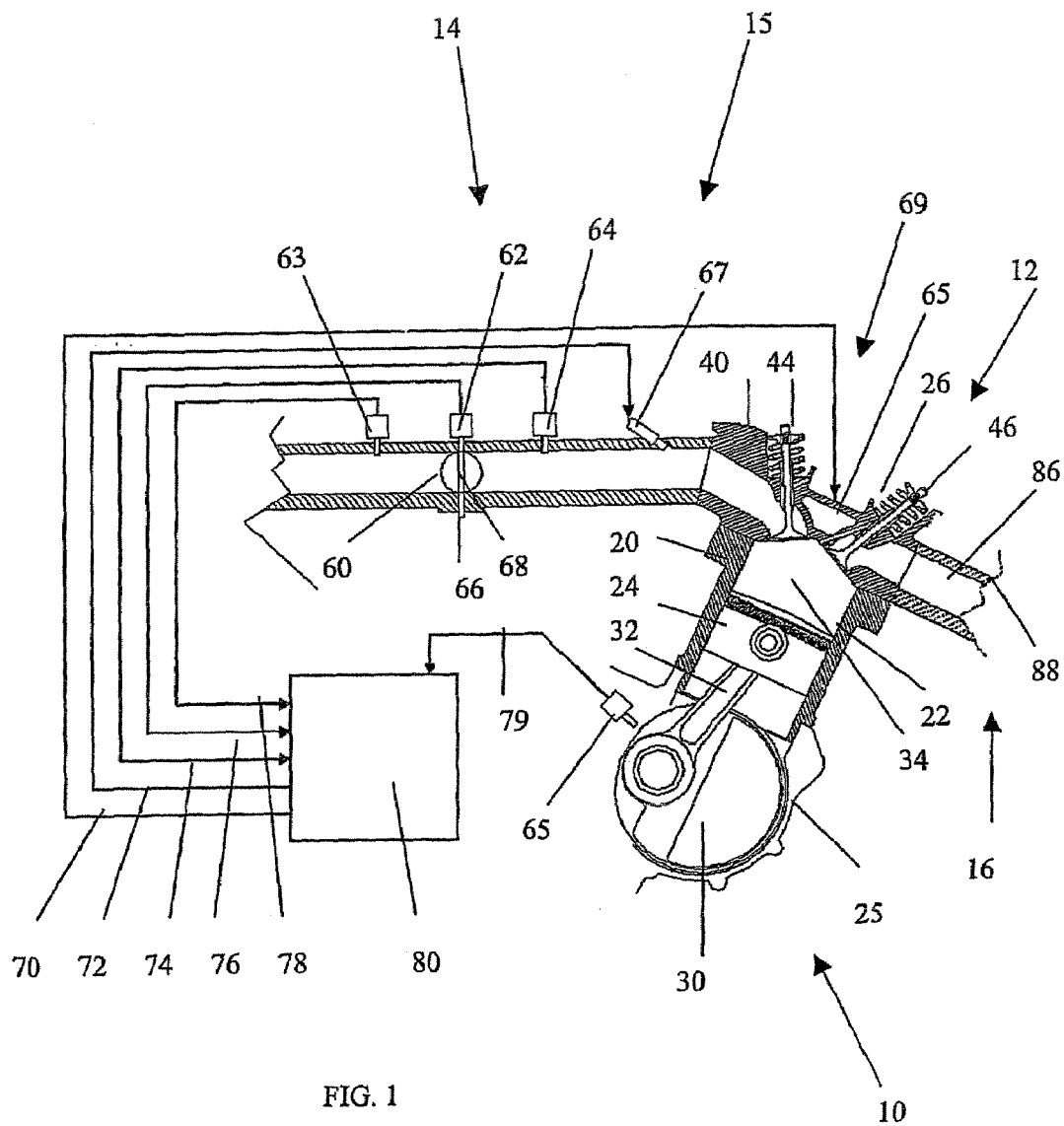
FIG. 1 is a schematic view showing a single cylinder internal combustion engine, configured in accordance with the preferred embodiments of the invention. The intake tract and part of the engine are shown generally in the upper portion of the figure. The engine controller is shown in the lower left portion of the figure. The Engine Controller, sensors, the fuel injection system and ignition link the two views together.

10 Internal combustion engine
12 Power head
14 Air induction system
15 Fuel injection system
16 Exhaust system
20 Cylinder block
22 Cylinder bore
24 Piston
25 Crank case
26 Cylinder head
30 Crankshaft
32 Connecting rod
34 Combustion chamber
40 Intake port
44 Intake valve
46 Exhaust valve
60 Throttle plate
62 Throttle position sensor
63 Intake air temperature sensor
64 Intake air pressure sensor
65 Crankshaft position sensor
66 Throttle plate axis of rotation
67 Fuel injector
68 Throttle shaft
69 Ignition system
70 Ignition signal
72 Injector signal
74 Intake pressure signal
76 Throttle position signal
78 Intake air temperature signal
79 Crankshaft position signal
80 Engine Control Unit (ECU)

86 Exhaust port
88 Exhaust pipe
90 Intake plenum
92 Plenum chamber
94 Intake runner
96 Induction air passage
98 Throttle body
100 Opening of the intake valve
101 Exhaust stroke
102 Intake stroke
103 Compression stroke
104 Power stroke
110 Closing of the intake valve
112 Approximate barometric pressure
115 Engine cycle
120 Intake air pressure signal
125 Opening of the intake valve
130 Closing of intake valve
140 Angular Crankshaft Position
145 360° of Crankshaft Rotation
148 End of 720° Engine Cycle
150 0° of Crankshaft rotation
160 Second engine embodiment
162 Induction system
164 Throttle body
166 Air inlet
168 Intake runner
170 Fuel injector
172 Throttle blade
174 Throttle shaft
176 Pressure port
178 Circuit board
180 Cover
182 Pressure transducer
184 Tubular ring
186 O ring seal
188, 190, 192, 194 Resistor elements
196, 198 Power terminals
200, 202 Intermediate terminals
204 Wheatstone bridge outport circuit
206 Temperature sensor circuit
208 Microprocessor
210 Operational amplifier
212 Transistor

DETAILED DESCRIPTION OF THE
PREFERRED EMBODIMENT(S)

FIG. 1 shows an internal combustion engine 10 for use in an All Terrain Vehicle (ATV, or Four-wheeler). The present invention may also find utility in applications using internal combustion engines, such as, for example but without limitation, personal watercraft, small jet boats, off-road vehicles, heavy construction equipment, motorcycles, lawn tractors, and gas powered yard implements.

As used throughout this description, the terms "forward", "front" and "fore" mean at or to the forward side of exhaust system 16, and the terms "rear", "reverse" and "rearwardly" mean at or to the opposite side of the front side, unless indicated otherwise.

The engine 10 operates on a four-stroke combustion cycle. As shown in FIG. 1, the engine 10 includes a cylinder block 20, which defines a cylinder bore 22. In the illustrated embodiment, the engine 10 is of the single cylinder type.

It is to be noted that the engine may be of any type (V-type, Inline, W-type), may have other numbers of cylinders, and/or may operate under other principles of operation (two-stroke, rotary, or Diesel principles).

A piston 24 reciprocates in the cylinder bore 22. A cylinder head assembly 26 is affixed to one end of the cylinder block 20 and defines a single combustion chamber 34 with the piston 24 and cylinder bore 22. Both ends of the cylinder block 20 are closed with a crankcase member (not shown) defining a crankcase chamber 25 therein.

The engine 10 includes and air induction system 14 and an exhaust system 16. The air induction system 14 is configured to supply air charges to the combustion chamber 34.

Figure 2:
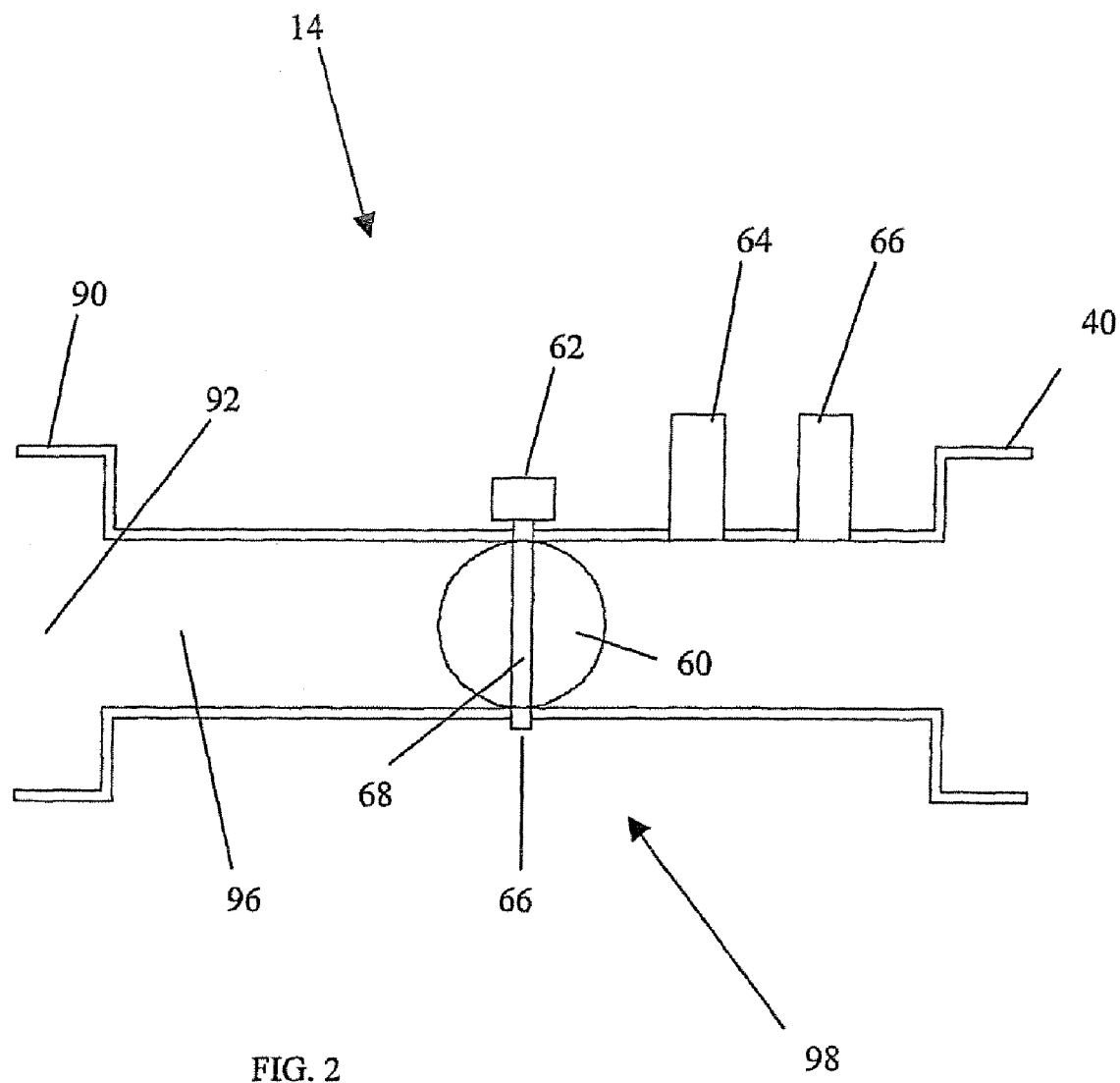
FIG. 2 is a schematic illustration of an air induction system of the engine shown in FIG. 1, with the pressure sensor mounted thereon.

With reference to FIG. 2, the induction system 14 includes a plenum chamber member 90, which defines a plenum chamber 92 therein. The intake runner 94 extends from the plenum chamber 92 and defines an induction air passage 96 therein. The intake passage 96 extends from the plenum chamber 92 to the intake port 40 formed in the cylinder head assembly 26.

With reference to FIG. 1, the intake port 40 is opened and closed by the intake valve 44. When the intake port 40 is opened, air from the intake passage 96 and intake port 40 flows into the combustion chamber 34.

The plenum chamber 92 preferably includes an inlet opening that opens to the external air supply (not shown). The opening to the plenum chamber 92 preferably includes some form of air filtration device (not shown). The plenum chamber 92 functions as an intake air silencer and/or a collector of air charges. The plenum chamber 92 is positioned on the rearward side of the engine 10 and the induction passage extends frontward from the plenum chamber 92 to the intake port 40.

As shown in FIG. 2, a throttle body 98 is provided within the intake runner 94. The throttle body 98 supports the throttle plate 60 for pivotal movement about an axis 66 of a throttle shaft 68, which extends generally vertically through the respective throttle body 98.

The throttle plate 60 is operated via a throttle cable (not shown). The throttle cable is connected to a thumb throttle (not shown) that may be provided on the handlebar (not shown) of the all terrain vehicle.

With reference to FIG. 1, a throttle position sensor 62 is arranged atop of the throttle shaft 68. A signal from the position sensor 62 is sensed by an engine controller ECU 80 via a throttle position data line 76 for use in controlling various aspects of the engine operation including, for example, but without limitation, fuel injection control and ignition timing, which will be described later. The signal from the throttle position sensor 62 corresponds to the engine load in one aspect, as well as the throttle opening.

The air induction passage 96 may include a bypass passage or idle air supply passage that bypasses the throttle plate 60, although such is omitted from FIG. 2. The engine 10 may also include an idle air adjusting unit (not shown) which is controlled by the ECU 80.

In operation, air is introduced into the powerhead 12 and passes through the inlet opening of the plenum chamber 92. During operation of the engine 10, an air charge amount is controlled by the throttle plate 60 to meet requirements of the engine 10. The air charge then flows through the runner 94 into the intake port 40.

As described above, the intake valve 44 are provided at the intake port 40. When the intake valve 44 is opened, the air is supplied to the combustion chamber 34 as an air charge. Under idle running condition, the throttle plate 60 is generally closed. The air, therefore, enters the intake port 40 through the idle air adjusting unit (not shown) which is controlled by the ECU 80. The idle air charge adjusted in the adjusting unit is then supplied to the combustion chamber 34 via the intake port 40. The rpm of the engine 10 at idle is adjusted by varying the small opening in the throttle plate 60. This is accomplished by adjusting a set screw (not shown) to limit the lower travel of the throttle plate 60 about axis 66.

With reference to FIG. 1, the exhaust system 16 is configured to discharge burnt gases, or exhaust gases, from the engine's 10 combustion chamber 34. The exhaust port 90 is defined by the cylinder head assembly 26 and is opened and closed by the exhaust valve 46. When the exhaust port 86 is opened, the combustion chamber 34 communicates with a single exhaust pipe 88, which guides the exhaust gases downstream through the exhaust system 12.

A single camshaft (not shown) is provided to control the opening and closing of the intake valve 44 and the exhaust valve 46. The camshaft has cam lobes that act against valves 44, 46 at predetermined timing in relation to the crankshaft 30 to open and close the intake port 40 and exhaust port 90. The camshaft is journaled in the cylinder head assembly 26 and is driven by a chain (not shown) mechanically connected to the crankshaft 30.

With reference to FIG. 1, the engine 10 also includes a fuel injection system 15. The fuel injection system 15 includes a fuel injector 67 which has an injection nozzle exposed to the intake port 40 so that fuel is directed toward the combustion chamber 34. A main fuel supply is located in a fuel tank (not shown) from which fuel is supplied via fuel system (not shown). Fuel is dawn from the fuel tank through a fuel filter (not shown) by a fuel pump (not shown). The pressure of the fuel is regulated by a fuel pressure regulator (not shown) and the fuel is sent to the fuel rail (not shown) and provided to the injector 67 for injection into the combustion chamber 34. Excess fuel that is not used by the injectors is fed through a fuel return line that is provided back to the fuel tank. The timing and duration of the fuel injection pulse is dictated by the ECU 80, which is described below in detail.

The fuel charge from the fuel injector 67 enters the combustion chamber 34 with an air charge at the moment the intake valve 44 is opened. Since the fuel pressure is regulated by the pressure regulator, a duration during which the nozzles of the injector 67 are opened is determined by the ECU 80 to measure the amount of fuel to be injected by the fuel injector 67. The ECU 80 through the fuel injector control line 72 thus controls the duration and the injection timing. Preferably, the fuel injector 67 has nozzles that are opened by solenoid action, as is know in the art. Thus the fuel injector control line 72 signals the solenoids to open and close according to the timing and duration determined by the ECU 80.

The engine 10 further includes an ignition system, generally indicated by reference to numeral 67. A spark plug 65 is fixed to the cylinder head assembly 26 and is exposed to the combustion chamber 34. The spark plug 65 ignites the air and fuel charge mixture in the combustion chamber 34 with timing as determined by the ECU 80. For this purpose, the ignition system 69 preferably includes an ignition coil (not shown) interposed between the spark plug 65 and the spark plug control line 70.

The engine 10 also preferably includes an AC generator (not shown) for generating electrical power. Additionally, the engine 10 preferably includes a battery (not shown) for storing electrical energy from the AC generator and to supply power to the ECU 80, the engine sensors (Intake Air Temperature sensor 63, Throttle Position Sensor 62, Intake Air Pressure sensor 64, Crankshaft Position sensor 65), fuel pump, fuel injector 67, and the ignition coil.

While not illustrated, the engine 10 also includes a recoil starter or electric starter motor to drive the crankshaft 30 for starting the engine 10. The engine 10 is turned over at a speed where the engine can operate under its own power.

A transmission (not shown) is typically integrated to the engine crank case 25 casting in an engine of this type. Although it is not illustrated power is coupled from the crankshaft, through the transmission, and to the vehicle drive system to provide motion.

The engine 10 also preferably includes a lubrication system (not shown). This lubrication system is provided for lubricating certain portions of the engine 10, such as, for example, but without limitation, the pivotal joints of the connecting rod 32 with the crankshaft 30 within the crank case 25 and the walls of the cylinder bore 22.

The engine 10 also preferably includes a cooling system (not shown) for cooling the heated portions of the cylinder block 20 and the cylinder head 26. A water jacket (not shown) is defined in the cylinder block 20, and is in thermal communication with the cylinder bore 22. A water pump (not shown) circulates the coolant through the engine 10 and a radiator (not shown).

As noted above, the ECU 80 controls engine operations including fuel injection from the fuel injectors 67 and ignition timing to the spark plug 65, according to various control maps stored in the ECU 80. In order to determine appropriate control scenarios, the ECU 80 utilizes such maps and/or indices stored within the ECU 80 in reference to data collected from various sensors.

Any type of desired control strategy can be employed for controlling the time and duration of the fuel injection from the fuel injector 67 and the timing of the firing of the spark plug 65, however a general discussion of some engine conditions that can be sensed and some of the engine conditions that can be sensed for engine control follows. It is to be understood, however, that those skilled in the art will readily understand how various control strategies can be employed in conjunction with the components of the invention.

As shown in FIG. 1, a crank position sensor 65 measures the crank angle and sends it to the ECU 80, as schematically indicated. In the illustrated embodiment, the crank position sensor 65 is in the form of a crank trigger, which is configured to emit a single pulse for each revolution of the crankshaft 30. The signal from the crank position sensor 65 is transmitted to the ECU 80 via a crank position data line 79. Engine load can be sensed by the angle of the throttle plate 60, and is sensed by the throttle position sensor 62 and is transmitted to the ECU 80 via the throttle position data line 76.

An intake air temperature sensor 63 measures the temperature of the incoming air to the intake runner 94. The signal from the intake air temperature sensor 63 is transmitted to the ECU 80 via the intake air temperature data line 78. An intake air pressure sensor 64 is connected to the intake runner 94 between the throttle plate 60 and the intake port 40 and measures the pressure of the incoming air charge in the induction air passage 96. The measurement of the intake air pressure sensor 64 is transmitted via the intake air pressure data line 74 to the ECU 80.

The sensed conditions disclosed above are merely some of those conditions which may be sensed for under control and it is, of course, practicable to provide other sensors such as, for example, without limitation, an oxygen sensor, Fuel pressure sensor, fuel temperature sensor, Engine coolant temperature sensor, oil pressure sensor, barometric air pressure sensor, and cam position sensor.

The ECU 80 computes and processes the detected signal from each sensor based on a control map. The ECU 80 forwards control signals to the fuel injector 67 and spark plug 65. Respective control lines are indicated schematically in FIG. 1, which carry the control signals.

As noted above, the ECU 80 determines the appropriate duration of fuel injection in order to produce a charge with a desired air fuel ratio. Thus, part of the determination of fuel injection duration is based on the induction air through the induction passage 96. The mass flow rate of the induction air charge through the induction passage is determined by the ECU 80 and a stoichiometric ratio of fuel is added by the fuel injector 67 as determined by the ECU 80 and fuel injector control line 72.

Figure 3:
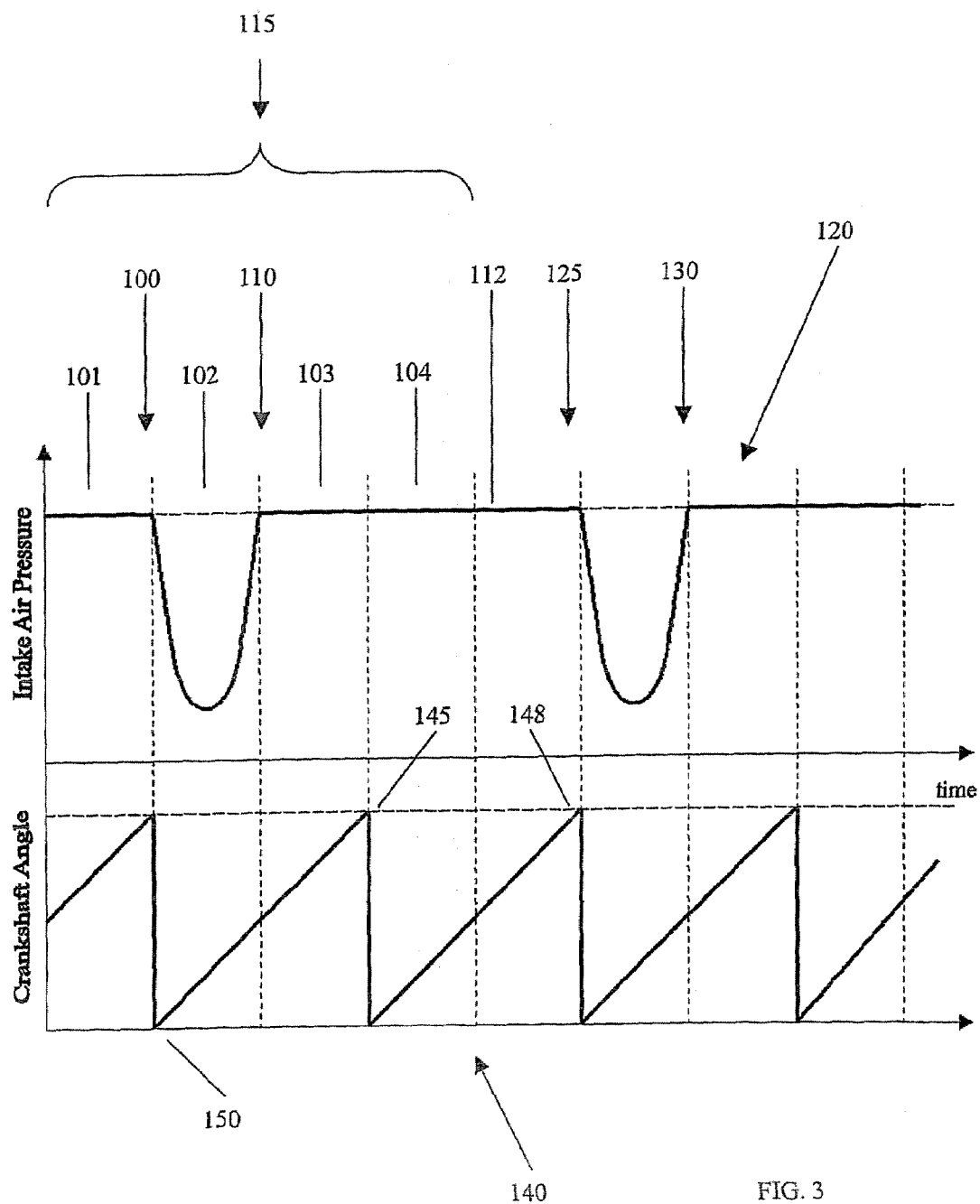
FIG. 3 is a graphical illustration of the timing relationship between an output signal of the pressure sensor shown in FIG. 2 and actual crankshaft position.

During operation of the engine 10, the ECU 80 samples the output signal from the intake pressure sensor 64 to determine crankshaft position 140 while the crankshaft 30 rotates from 0° of crankshaft rotation 150, through 360° of crankshaft rotation 145, and 720° or crankshaft rotation 148. Both 360° of crankshaft rotation 145 and 720° of crankshaft rotation 148 are known as Top Dead Center as the Piston 24 is in the top most position of travel within the cylinder bore 22. Monitoring the signal from the crank position sensor 65 adds resolution to the determination of the crankshaft position 140. In reference to FIG. 3, the intake pressure signal 120 fluctuates with the opening of the intake valve at 100 and closing of the intake valve at 110, during the intake stroke 102 of the four-stroke engine 10. During the intake stroke 102, the intake valve 44 opens to allow the intake air/fuel charge to flow from the intake port 40 into the combustion chamber 34 creating pressure fluctuation 100 on the intake pressure signal 120 from the intake pressure sensor 64. As the piston 24 travels to the bottom portion of its travel in the cylinder bore 22, the intake valve 44 closes creating pressure fluctuation 110 on the intake pressure signal from the intake pressure signal 120 from the intake pressure sensor 64.

In this embodiment, the intake pressure signal 100 to 110 from the intake pressure sensor 64 is observed every two full crankshaft rotations as the engine 10 is of the four-stroke type. The time difference between these pressure fluctuations is indicative of engine speed N and can be calculated by the ECU 80. In addition, the pressure fluctuations 100 to 110 allows the ECU 80 to determine engine phase on a 720° engine cycle as the intake valve 44 only opens once per every two full rotations of the crankshaft 30 on the four stroke engine cycle. During the compression stroke 103, power stroke 104, and exhaust stroke 101 the intake pressure sensed by the intake pressure sensor 64 is close to the barometric air pressure 112 of the outside air.

In order to determine proper engine timing for the ECU 80 to inject fuel from the fuel injector 67 or trigger the ignition of the spark plug 65, the ECU 80 must have a model of the engine characteristics having inputs from the intake air pressure sensor 64 and optionally the crank position sensor 65 to determine crankshaft position 140 while the engine 10 is operating. An example of a model, for example, but without limitation, is the implementation of a predictive model where crankshaft position is based on the time period of the previous cycle 115 of intake air pressure fluctuations 100 to 110 of the intake air pressure signal to predict crankshaft position for the next cycle 125 to 130. With a model of this type, the engine timing of each cycle 115 is based on the previous engine cycle. Other control algorithms could be implemented, without limitation, with the same technology of this invention for sensing engine speed N, phase, and/or position.

It is to be noted that the intake air pressure signal may have additional small fluctuations (not shown) depending upon engine 10 operating conditions. These fluctuations may take the form of signal "noise" and can be attenuated via electronic filter within the ECU 80 or digitally by software in the ECU 80 itself to attenuate predetermined frequencies. By including any passive form of signal smoothing, time delays and signal attenuation may be introduced into the present air pressure signal to the ECU 80.

Figure 4:
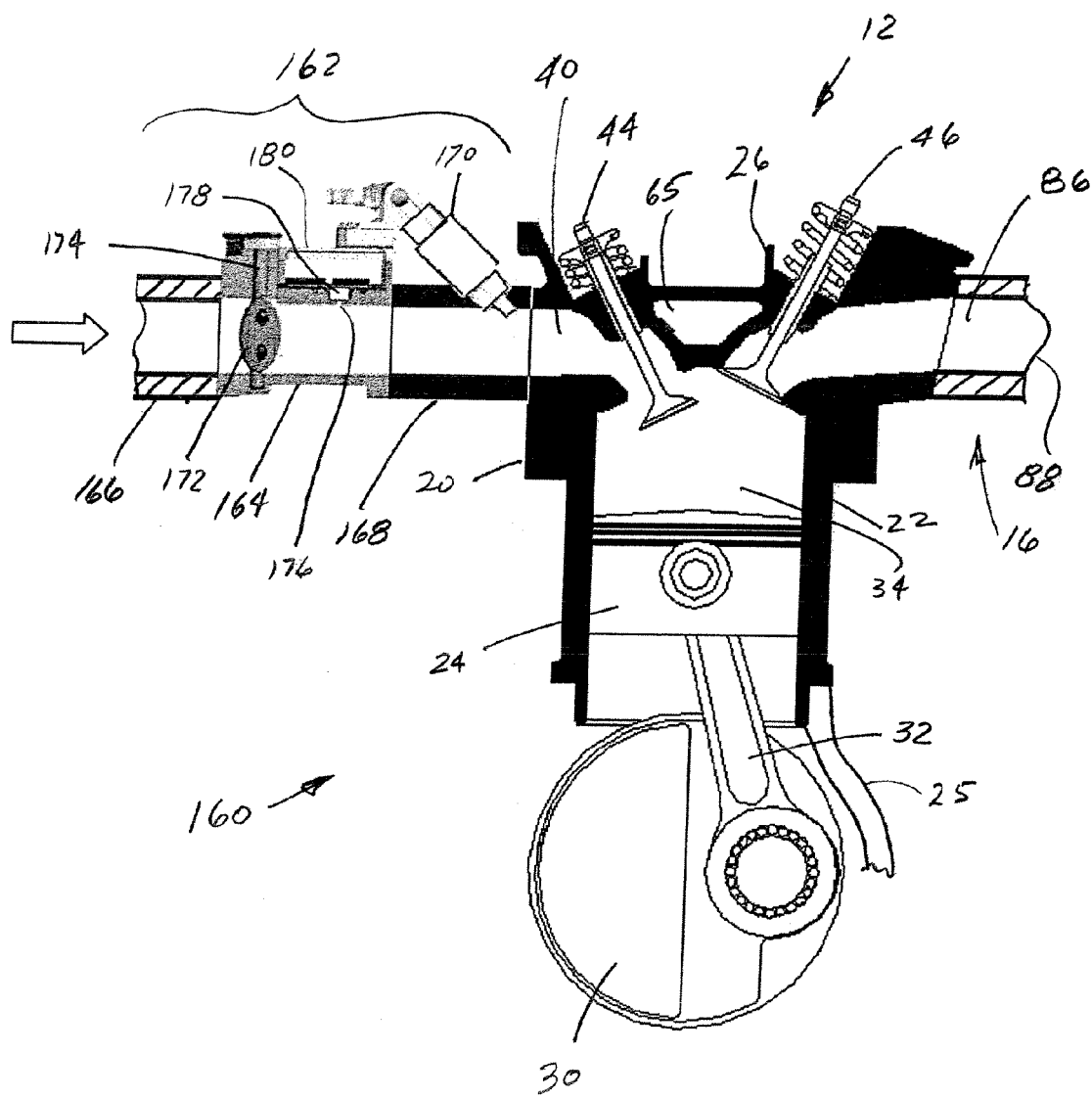
FIG. 4 is a schematic view showing an alternative single cylinder engine embodiment of the invention.

A second alternative embodiment of the invention is illustrated in internal combustion engine 160 depicted in a cross-section in FIG. 4. Engine 160 differs from engine 10 of FIG. 1 in the induction system region. Similar parts retain common numbering. In engine 160 induction system 162 replaces induction system 14 described previously. Induction system 162 is made up of a throttle body assembly 164, clean air inlet 166 which is connected to a conventional air cleaner and an intake runner 168 interposed between the throttle body assembly 164 and the engine intake port 40. Intake runner 168 is optional if fuel injector 170 is located in the throttle body assembly 164 or in the engine head adjacent intake port 40. In the embodiment illustrated, intake runner 168 serves to mount electronic fuel injector 170 in an inclined orientation in order to spray fuel into the intake port in the direction of intake valve 44. Electronic fuel injector 170 is of a conventional design having a conventional connection to a source of pressurized fuel and an internal solenoid controlled by an electrical control signal. The solenoid regulates the flow of fuel through a nozzle which is appropriately sized for the engine's maximum is fuel demand. Preferably, intake runner 168 is formed of glass filled plastic providing a thermal break between the engine cylinder head and the throttle body 164 as well as locating fuel injector 170.

Throttle body 164 is further provided with a common butterfly type throttle blade 172 rotated by throttle shaft 174 in a conventional manner by a mechanical linkage. Throttle body 164 is provided with a pressure port 176 which communicates with the intake runner as illustrated. The pressure port is located intermediate the intake valve 44 and throttle blade 172, in order to be exposed to pressure fluctuations within the intake runner that results when the intake valve opens during an intake event. Mounted to the throttle body adjacent to the pressure port 176, is a circuit board 178 and associated cover 180. The throttle body is shown in more detail in FIGS. 5 and 7. Throttle body 164 and cover 180 collectively define an enclosed chamber in which circuit board 178 is housed.

Figures 5, 6, 7:
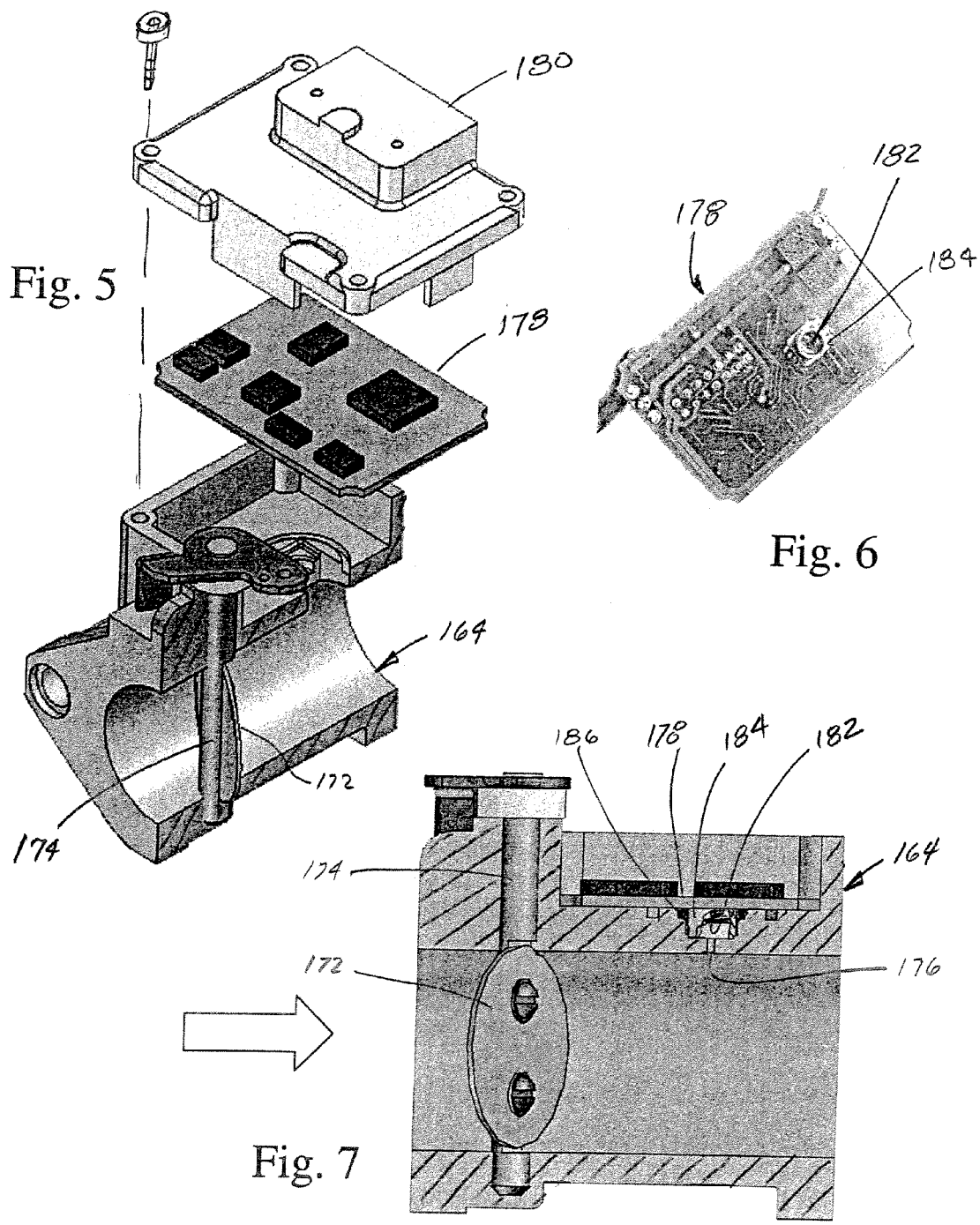
FIG. 5 is an enlarged exploded view of the throttle body assembly illustrated in the FIG. 4 embodiment of the invention.
FIG. 6 is the underside of the printed circuit board shown in FIG. 5.
FIG. 7 is an enlarged cross-sectional view of the throttle body assembly illustrating the pressure sensor, the circuit board and the pressure port.

On the underside of circuit board 178 as shown in FIG. 6 a pressure transducer assembly 182 is mounted which includes a tubular ring 184 extending thereabout. As shown in cross-sectional side elevation in FIG. 7, tubular ring 184 mounted to the circuit board is sealingly mounted to throttle body 164 via an elastomeric O-ring seal 186. O-ring seal 186 is oriented within an annular pocket formed in throttle body 164 extending about pressure port 176. Of course, other conventional sealing mechanisms can be used to interconnect the circuit board and the throttle body as would be known to one of ordinary skill in the art. Elastomeric seal 186 enables the circuit board 178 to removably attached to the throttle body 164 to sealingly connect the pressure sensor 180 to and to enclose one end of pressure port 176. Pressure port 176 is sufficiently large so that pressure fluctuations within the intake runner are experienced by pressure sensor 172 without significant attenuation or delay. By directly mounting pressure, sensor 172 on a printed circuit board 178, the amount of wiring and the cost and size of the system can be reduced and installation process greatly simplified. Preferably, substantially the entire fuel and spark control circuit, may be incorporated on printed circuit board 178. This can be achieved using conventional surface mount electronic components and a microprocessor.

Figure 8:
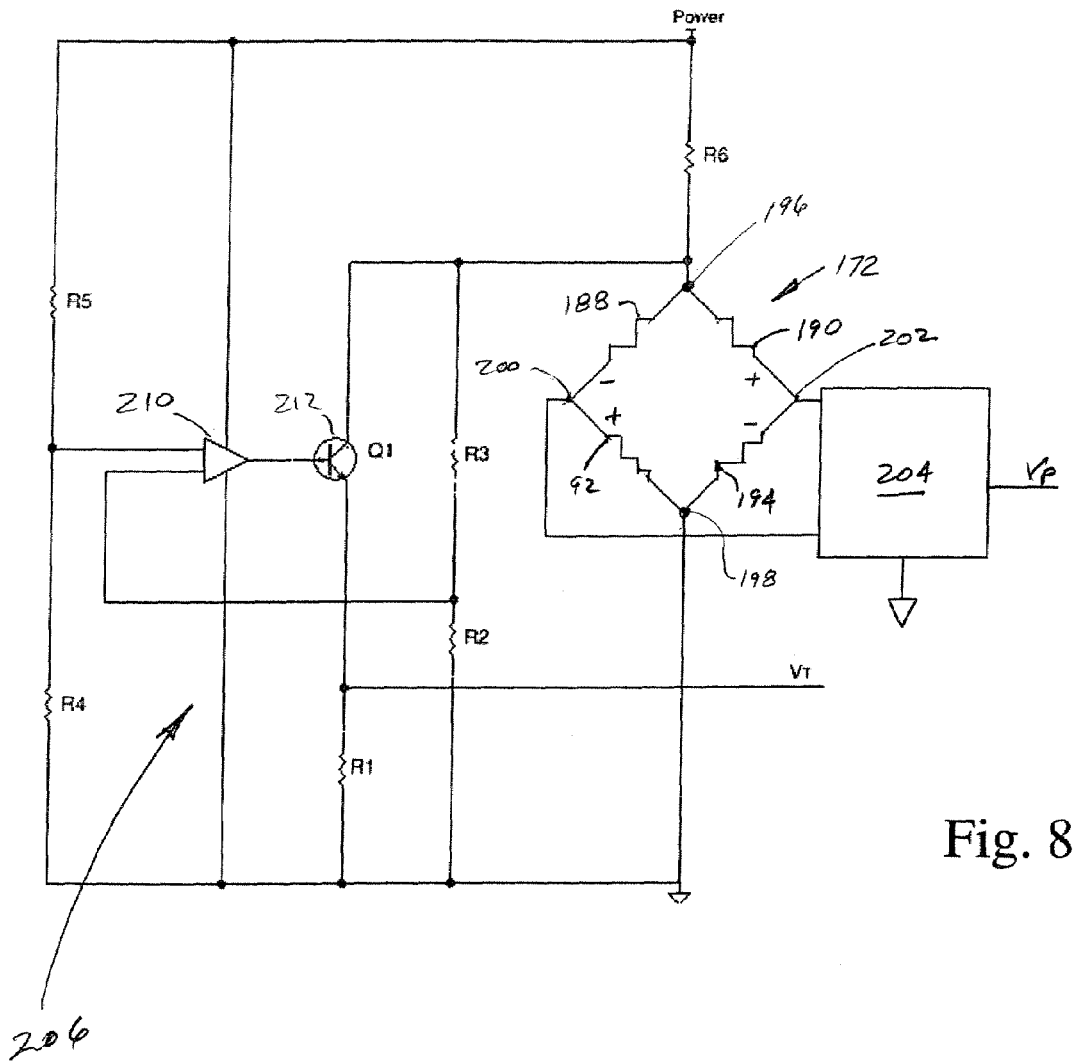
FIG. 8 is a circuit diagram of the pressure/temperature sensor circuit.

Preferably, pressure sensor 172 is formed by a wheatstone bridge resistive device having four pressure sensitive variable resistor elements. A schematic diagram of the bridge circuit is illustrated in FIG. 8. Four variable resistor pressure sensitive elements are oriented in a conventional wheatstone bridge arrangement with the resistive element 188, 190, 192 and 194 are arranged so that resistance across opposed power terminals 196 and 198 remains relatively constant as a function of pressure while the resistance across opposed intermediate terminals 200 and 202 varies proportional to pressure. A conventional wheatstone bridge output circuit 204 illustrated generates a pressure output voltage signal $V_P$ which is proportional to the pressure exerted on pressure sensor 182. A temperature sensor circuit 206 illustrated in the right side of the Figure provides a relatively simple way to determine the temperature of pressure sensor 182 without the need for a separate temperature probe. The output of temperature sensor circuit 206 generates a voltage signal $V_T$ which varies as a function of temperature.

The pressure sensor element 182 is comprised of four balanced resistive elements 188, 190, 192 and 194, arranged in a Wheatstone bridge configuration. A sensor of this type is available from Intersema Sensoric SA and is described in Product data sheet "MS54XX (RoHS*) Miniature SMD Pressure Sensor", Jun. 29, 2005, which is incorporated by reference herein. The elements are mounted on a flexible substrate which is subjected to intake pressure. These elements elastically deform in response to pressure changes with a corresponding change in resistance. The overall resistance of the bridge (between 196 and 198) remains constant with respect to pressure changes. The bridge output (between terminals 200 and 202) voltage difference is proportional to the pressure exerted on the pressure sensing element 182. This configuration has the ability to measure approximate ambient temperature and vacuum pressure, and is considered an absolute pressure sensor.

It is well known in the art that resistive pressure sensing elements especially piezo-resistive materials have a resistance dependant on the temperature of the element. As the temperature changes, the overall resistance of the bridge will change proportionately. This dependency typically necessitates temperature correction of the pressure measurement.

Conventional means of measuring temperature or pressure from these devices require the bridge to be alternatively biased with a current for temperature measurements, and voltage for pressure measurements. In this fashion only one of the two attributes (temperature or pressure) can be measured at any given time.

The preferred embodiment of this invention allows for both temperature and pressure to be measured simultaneously, in real time, from a single sensory element. Using a temperature sensor circuit 206, comprising an operational amplifier 210 and a transistor 212, the bridge voltage ($V_{BR}$) is held constant even though the total bridge resistance changes with respect to temperature. The current through the transistor 212 is proportional to the current through the bridge. This current is passed through resistor R1 and creates a voltage ($V_T$) which is proportional to the change in Bridge resistance, and thus gives a measure of bridge temperature.

Knowing the temperature of the bridge element allows correction of the temperature dependant pressure signal. The temperature of the element also has a strong correlation to the temperature of the air stream that it is exposed to, thus indicating the intake air temperature of the system. This embodiment allows for real-time measurements of intake air temperature and intake pressure fluctuations without processing time delays of traditional MAP sensor technology.

While this embodiment shows resistive elements, this design can be implemented with other pressure sensing devices including capacitive devices.

Figure 9:
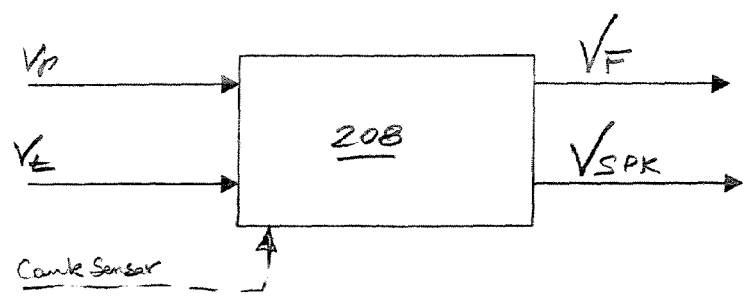
FIG. 9 is a block diagram of the engine controller.

Both the pressure output signal $V_P$ and the temperature output signal $V_T$ range from 0 to 3.3 volts in order to provide the desired direct input needed for the selected microprocessor 208 selected shown in FIG. 9. In the preferred embodiment of the invention illustrated, a conventional microprocessor commonly used in ECU's is utilized, however, it should be readily appreciated that other types of microprocessors or various combinations of semiconductors and discreet devices can be used to implement the present invention. The basic inputs to the microprocessor are a pressure signal and a temperature signal. Based upon this limited information, the microprocessor is capable of generating a fuel injector output $V_F$ which in conjunction with a conventional fuel injector driver circuit, operates the fuel injector solenoid. The microprocessor is preferably also capable of generating a a spark output $V_{SPK}$, which in conjunction with a conventional ignition coil driver circuit, fires the sparkplug. The invention however can be used with engines having a magneto ignition or other stand alone ignition system.

Figure 10:
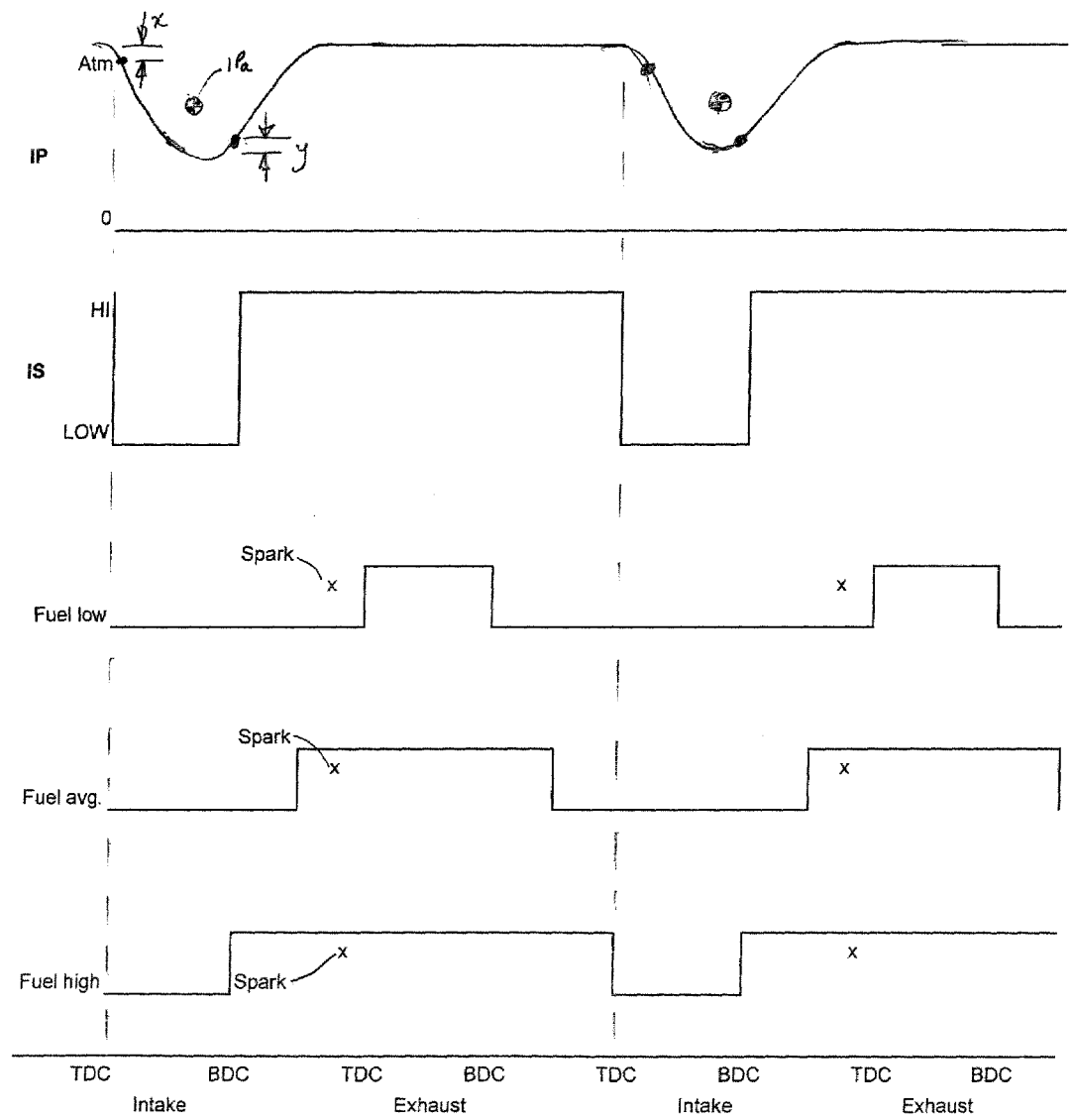
FIG. 10 is a timing diagram illustrating intake pressure, the intake signal and the spark and fuel injector output signal at various engine load levels.

The pressure input signal is illustrated as a function of crank angle degrees in FIG. 10. Intake pressure signal IP fluctuates dramatically as the intake valve opens and closes as the engine is running. The low pressure excursion below atmospheric pressure is most significant at low load requirements when the throttle is closed resulting in a low airflow into the cylinder. At high engine loads, when the throttle is open, the low pressure excursion is less pronounced, but still quite perceptible. The intake pressure signal starts out near atmospheric pressure as illustrated on the right hand edge of FIG. 10. As the intake valve opens, shortly before top dead center, the intake runner pressure will begin to drop. Minimum intake runner pressure will typically occur between 90° after top dead center when piston velocity is the greatest and bottom dead center when piston velocity is zero. The shape of the intake pressure occur varies with speed, load and engine geometry, but for any given engine it is quite repeatable enabling the intake pressure wave form to provide engine timing information without the need to install engine crankshaft or camshaft position sensors.

Through a series of threshold filters implanted in software in the microprocessor 208, a square wave intake wave form IS is created. The intake signal IS is initially high and drops to the low state once the intake pressure IP signal drops from its maximum level by a threshold amount X. Once the intake pressure signal reaches its minimum point and increases a threshold amount Y, the intake signal IS returns to the high state. The intake signal low state generally corresponds to the intake valve open event.

The microprocessor 208 utilizes the magnitude of the drop and intake pressure $V_P$ during the intake event to estimate the mass of the intake air charge. The volume of the intake air charge is assumed to the engine displacement and the average intake air pressure is estimated to be atmospheric pressure less two-thirds of the minimum intake pressure observed during the intake event illustrated as point IPa in FIG. 10. Preferably, the estimated mass of the intake charge is adjusted for intake temperature based upon the intake temperature output $V_T$ from temperature circuit 206.

Once the mass of the intake air charge has been estimated, the required fuel will be determined based upon the desired air fuel ratio. This can be done in a simple look up table which has an injector duration time correlated with each air mass volume table entry. The injection time will of course be dependent upon the injector nozzle size and the nominal fuel pressure. The larger the nozzle size or the larger the fuel pressure, the shorter the injection duration necessary to achieve the desired fuel flow proportional to the observed intake charge air mass.

Ideally, the fuel will be injected during the time period in which the intake valve is closed. While this control strategy is preferred other injection times can be employed. Injecting in the center of the intake valve closed time interval is believed to achieve the best and most consistent engine performance and emissions. Alternatively, one can inject later in the intake valve closed the time window and even overlap the valve open time period at high load conditions.

In FIG. 10, three different fuel injector signals FI are illustrated at an average load, a light load and a high engine load. As illustrated in the drawing the fuel injector pulse duration varies with engine load with the pulse remaining generally centered within the intake valve closed time window. A spark output SPK is illustrated for each of the average, low and high load conditions. Preferably, the spark advance relative to top dead center will vary with engine load and engine speed. Light loads require more spark advance as do high engine speeds. Optimum spark advance is determined experimentally in a conventional fashion and used to populate a standard speed load table. Spark is then looked up, and preferably interpreted between the nearest speed and load conditions, in the table and real time during engine operation. A spark output pulse SPK is sent to a conventional spark driver circuit firing the spark plug in a standard manner as done in variable timing electronic spark ignition engines.

Utilizing the intake pressure profile to determine engine timing, timing error can be as much as 5° at some transient engine acceleration conditions. While this is perfectly acceptable for controlling the time of injection while at steady state in order to have optimum power and minimum emissions, preferably, spark advance timing error does not exceed 1° or 2°. Accordingly, where improved spark timing is desired, a simple once per revolution crank shaft position sensor located in advance of the maximum spark advance setting so that spark timing can accurately determined with minimal acceleration error. Of course, multiple sensors or multiple timing wheels can be used to further improve accuracy, but, a simple once per crankshaft revolution sensor located approximate, but in advance of the maximum spark advance setting can effectively minimize spark timing error.

The engine can additionally be provided with an engine temperature sensor and engine temperature input to the microprocessor. An engine temperature can be utilized to adjust the fuel ratio downwardly (to increase the amount of fuel) during a cold engine startup. This feature is of course optional and an engine may simply be provided with a conventional manual choke.

The present invention is particularly well suited to convert conventional carbureted engines to electronically control the fuel injection and spark ignition with minimal changes to the engine or engine assembly process. This technology enables an engine manufacturer to simply change over to electronic fuel injection and spark ignition control or to make carbureted engines and electronic fuel injection engines on the same assembly line. One of the reasons of this conversion to electronic fuel injection can be so cost effective is the ability of the preferred embodiment of the invention to accurately estimate charge mass, and engine load based upon intake pressure alone without need for an electronic throttle position controller sensor. The invention is able to accurately estimate air charge mass based on intake pressure and temperature without the need for a mass flow meter. Similarly, the invention is capable of calculating an intake signal IS indicating engine timing when the intake valve is open without using conventional crankshaft and camshaft position indicators. While the system is designed to have the minimum of the sensor inputs in order to control costs, of course one could always add additional sensor inputs of a redundant nature when still utilizing the present invention.

While the present invention is illustrated in a single cylinder engine the invention can be easily adapted to an engine having two or more cylinders. In a multi-cylinder engine the intake pressure port is preferably located in a location where it can relatively cleanly measure the pressure in one intake runner with minimal pressure fluxuations caused by other intake events. Since the timing of the intake spark and injection events in all of the cylinders is the function of an engine design geometry. A single pressure input can be utilized to generate fuel and spark outports for all cylinders.

Additionally, the method of the present invention can be utilized, to control a fuel injector and the spark timing in an engine having a much more complex or sophisticated control strategy such as an engine with a closed loop fuel control having oxygen sensor, an air mass sensor and a throttle position sensor. This system can be utilized to run the engine in the event of a failure of any of the conventional input devices enabling the engine to run in an open loop mode for a period of time until the faulty sensors can be repaired.

Of course, the foregoing description is that of certain features, aspects and advantages of the present invention to which various changes and modifications may be made without departing from the spirit or scope of the present invention. While I have shown and described specific embodiments of this invention, further modifications and improvements will occur to those skilled in the art. All such modifications that retain the basic underlying principles disclosed and claimed herein are within the scope of this invention. The present invention, therefore, should only be defined by the appended claims.

What is claimed is:

1. An engine control apparatus for an engine having at least one cylinder, a piston in said cylinder, a crankshaft connected to said piston, said piston being adapted to reciprocate between top dead center position and bottom dead center position defining a combustion chamber having an intake valve controlling the induction of a air and fuel charge mass into said combustion chamber with predetermined timing related to said crankshaft's angular position and a spark plug for igniting the air and fuel charge, said engine air induction system having an air induction chamber contiguous with said intake valve with an intake throttle valve for regulating intake air flow there through and an electronically controlled fuel injector for introducing a metered fuel charge into the intake air mass, the engine control apparatus comprising;

(a) a pressure sensing element in communication with said air induction chamber providing an intake pressure signal which fluctuates during an intake event;

(b) a pressure signal processing circuit which uses the intake pressure signal to develop at least one timing signal per intake event providing an indication of a crankshaft angular position with in an engine cycle, with the time between timing pulses being an indication of engine crankshaft speed, and an air flow calculation without reference to the physical position of the intake throttle valve or an external main flow sensor; and (c) a fuel injector driver circuit which based on the at least one timing pulse and the air flow signal provides a fuel injector output signal to cause the fuel injector to open at a selected period during an engine cycle and for a duration necessary to inject a charge of fuel in proportion to the intake air charge mass.

2. The engine control apparatus of claim 1 wherein the fuel injector driver circuit is provided with an temperature input which is used to in part to calculate intake air charge mass and the associated required fuel charge.

3. The engine control apparatus of claim 1 wherein the pressure sensing element comprises a four sensor array arranged in a wheatstone bridge.

4. The engine control apparatus of claim 3 wherein the wheatstone bridge is formed by four variable pressure sensitive resistors which are arranged and balanced so that the resistance across the opposed power terminals remains relatively constant while the resistance across the opposed intermediate terminals varies as a function of pressure.

5. The engine control apparatus of claim 4 wherein the four variable pressure sensitive resistors forming the wheatstone bridge are temperature sensitive so that the resistance across the opposed power terminals of the bridge varies as a function temperature, engine control apparatus further comprising a temperature circuit which generates a temperature signal based upon the resistance across the opposed power terminals of the bridge, wherein the fuel injector driver circuit is provided with an temperature signal input which is used to in part to calculate intake air charge mass and the associated required fuel charge.

6. The engine control apparatus of claim 1 further comprising an ignition driver circuit which based on the at least one timing pulse provides in ignition output signal to fire the sparkplug at a selected time during an engine cycle.

7. The engine control apparatus of claim 1 wherein ignition driver circuit varies the timing of the ignition output signal based in part on a signal which is generally proportional to engine load and speed.

8. The engine control apparatus of claim 1 wherein pressure signal processing circuit includes a peak detector which detects the low pressure valley in the pressure signal caused by an intake event an generates the timing signal after the pressure has increased from the valley by threshold amount.

9. The engine control apparatus of claim 1 wherein the fuel injector driver circuit provides a fuel injector output signal during the time period when the intake valve is closed.

10. The engine control apparatus of claim 9 wherein the fuel injector output signal is approximately centered within the time interval when the intake valve is closed.

11. The engine control apparatus of claim 1 wherein the pressure signal processing circuit is provided with a filter to attenuate noise in the pressure signal at a frequency higher than twice the maximum engine speed while causing less than 1 crank angle degree of phase shift.

12. An engine control apparatus for an engine having at least one cylinder, a piston in said cylinder, a crankshaft connected to said piston, said piston being adapted to reciprocate between top dead center position and bottom dead center position defining a combustion chamber having an intake valve controlling the induction of a air and fuel charge mass into said combustion chamber with predetermined timing related to said crankshaft's angular position and a spark plug for igniting the air and fuel charge, said engine air induction system having an air induction chamber contiguous with said intake valve with an intake throttle valve for regulating intake air flow there through and an electronically controlled fuel injector for introducing a metered fuel charge into the intake air mass, the engine control apparatus comprising;

(a) a pressure sensing element in communication with said air induction chamber providing an intake pressure signal which fluctuates during an intake event;

(b) a pressure signal processing circuit which uses the intake pressure signal to develop at least one timing pulse per intake event with providing an indication of a crankshaft angular position with in an engine cycle, with the time between timing pulses being an indication of engine crankshaft speed;

(c) a fuel injector driver circuit which based on at least, a temperature input and the air flow signal, provides a fuel injector output signal to cause the fuel injector to open during a selected period in the engine cycle and for a duration necessary to inject a charge of fuel in proportion to the intake air charge mass without referencing the physical position of the intake throttle valve; and (d) an ignition driver circuit which provides in ignition output signal to fire the sparkplug at a selected time during an engine cycle.

13. The engine control apparatus of claim 12 wherein the pressure sensing element comprises a four pressure sensitive variable resistors array arranged in a wheatstone bridge and balanced so that the resistance across the opposed power terminals remains relatively constant while the resistance across the opposed intermediate terminals varies as a function of pressure.

14. The engine control apparatus of claim 13 wherein the four pressure sensitive variable resistors forming the wheatstone bridge are temperature sensitive so that the resistance across the opposed power terminals of the bridge varies as a function temperature, engine control apparatus further comprising a temperature circuit which generates a temperature signal based upon the resistance across the opposed power terminals of the bridge, wherein the fuel injector driver circuit is provided with an temperature signal input which is used to in part to calculate intake air charge mass and the associated required fuel charge.

15. The engine control apparatus of claim 12 wherein ignition driver circuit varies the timing of the ignition output signal based in part on a signal which varies as a function of engine load.

16. The engine control apparatus of claim 12 wherein pressure signal processing circuit includes a peak detector which detects the low pressure valley in the pressure signal caused by an intake event an generates the timing signal when the pressure has increased from the valley by threshold amount.

17. The engine control apparatus of claim 12 wherein the fuel injector driver circuit provides a fuel injector output signal during the time period when the intake valve is closed.

18. The engine control apparatus of claim 12 further comprising an engine position sensor providing an engine position output signal at least once during each engine cycle, the output signal being used by the ignition driver circuit to accurately fire the sparkplug at the desired time during the engine cycle.

19. A method of controlling the delivery of fuel to an engine having at least one cylinder, a piston in said cylinder, a crankshaft connected to said piston, said piston being adapted to reciprocate between top dead center position and bottom dead center position defining a combustion chamber having an intake valve controlling the induction of a air and fuel charge mass into said combustion chamber with predetermined timing related to said crankshaft's angular position and a spark plug for igniting the air and fuel charge, said engine air induction system having an air induction chamber contiguous with said intake valve with an intake throttle valve for regulating intake air flow there through and an electronically controlled fuel injector for introducing a metered fuel charge into the intake air mass, the method comprising:
 (a) providing a pressure sensing element in communication with the air induction chamber;
 (b) generating an intake pressure signal which fluctuates during an intake event in response to the intake valve opening;
 (c) generating an engine timing pulse from the intake pressure providing an indication of a crankshaft angular position with in an engine cycle, with the time between timing pulses being an indication of engine crankshaft speed;
 (d) generating an engine load signal without reference the physical position of the intake throttle valve based upon the timing pulse and the intake pressure signal;
 (e) generating a fuel injector output signal based on the at least one timing pulse and the engine load signal; and
 (f) causing the fuel injector to open in response to the fuel injector output signal at a selected period during an engine cycle and for a duration necessary to inject a charge of fuel which is in proportion to the intake air charge mass.

20. The method according to claim 19, further comprising providing an ignition driver circuit which based on the at least one timing pulse generates an ignition output signal, and firing the sparkplug at a selected time during an engine cycle in response to the ignition output signal.

21. The method according to claim 19, wherein the step of providing a pressure sensing element further comprises a four pressure sensitive variable resistor array arranged in a wheatstone bridge and load balanced so that the resistance across opposed power terminals remains relatively constant while the resistance across opposed intermediate terminals varies as a function of pressure.

22. The method according to claim 19, wherein the four pressure sensitive variable resistors forming the wheatstone bridge are temperature sensitive so that the resistance across the opposed power terminals of the bridge varies as a function of temperature, and the step of generating fuel injector output signal utilizes a temperature signal input derived from the observed resistance across the opposed power terminals of the bridge to in part to calculate the required fuel charge and associated injection duration.

23. An engine control apparatus for an engine having at least one cylinder, a piston in said cylinder, a crankshaft connected to said piston, said piston being adapted to reciprocate between top dead center position and bottom dead center position defining a combustion chamber having an intake valve controlling the induction of a air and fuel charge mass into said combustion chamber and a spark plug for igniting the air and fuel charge, said engine air induction system having an air induction chamber contiguous with said intake valve having an intake throttle valve for regulating intake air flow, a pressure port intermediate the throttle and the intake valve and an electronically controlled fuel injector for introducing a metered fuel charge into the intake air mass, the engine control apparatus comprising;
 (a) a pressure sensing element in communication with pressure port in the air induction chamber providing an intake pressure signal which fluctuates during an intake event, the pressure sensing element affixed to a circuit board mounted to the engine air induction system adjacent the pressure port;
 (b) a pressure signal processing circuit mounted on the circuit board which uses the intake pressure signal to develop at least one timing pulse per intake event with providing an indication of a crankshaft angular position with in an engine cycle, with the time between timing pulses being an indication of engine crankshaft speed, and an air flow signal without reference the physical position of the intake throttle valve; and
 (c) a fuel injector driver circuit located at least in part on the circuit board, which based on the at least one timing pulse and the air flow signal provides a fuel injector output signal to cause the fuel injector to open during a selected period in the engine cycle and for a duration necessary to inject a charge of fuel which is proportional to the intake air charge mass.

24. The engine control apparatus of claim 23 further comprising a seal interposed between the pressure port and a region of the circuit board surrounding the pressure sensor to allow the pressure sensor to sealingly enclose an end of the pressure port.

25. A system for measuring pressure and temperature of an intake air stream in an internal combustion engine comprising:
 (a) a flexible substrate which deforms in response to fluid pressure exerted on a surface thereof;
 (b) an array of variable resistors arranged in a wheatstone bridge and affixed to the flexible substrate in a location which causes the resistors to elastically deform and vary in resistance in response to exertion of a pressure on the flexible substrate, a variable resistor being arranged in a manner which causes the overall bridge resistance across an opposed pair of bridge power terminals to remain constant as a function of pressure while the resistance across a pair of opposed output terminals varies as a function of pressure and;
 (c) a temperature circuit which generates a temperature output signal by comparing the overall bridge resistance across the opposed pair of bridge power terminals to a known reference, wherein temperature and pressure can be similarly measured crossing a single bridge.

26. The system of claim 25 wherein the variable resistors are piezo-resistive elements.

27. The system of claim 26 wherein the piezo-resistive elements are arranged about the bridge in a plus-minus-plus-minus manner.

28. The system of claim 25 wherein the temperature circuit further comprises a reference resistor located in a remote from the flexible substrate.

29. A throttle body assembly for use in an engine having at least one cylinder, a piston in said cylinder, a crankshaft connected to said piston, said piston being adapted to reciprocate between top dead center position and bottom dead center position defining a combustion chamber having an intake valve controlling the induction of a air and fuel charge mass into said combustion chamber with predetermined timing related to said crankshaft's angular position and a spark plug for igniting the air and fuel charge, an engine air induction system having an air induction passage contiguous with said intake valve, and an electronically controlled fuel injector for introducing a metered fuel charge into the intake air mass, the throttle body assembly comprising;

- a throttle body housing defining an internal passageway cooperating with the induction passageway of the engine, and a throttle valve controlling the flow of air through the internal passageway, the throttle body having a pressure port formed therein extending into the internal passageway down stream of the throttle; and
- a circuit board mounted on the throttle body housing adjacent the pressure port, the circuit board having mounted thereon:
    - (a) a unitary sensor element in communication with said air pressure port simultaneously providing an intake pressure signal and a temperature signal;
    - (b) a signal processing circuit which uses the intake pressure signal and the temperature signal to develop an air mass flow signal without reference to the physical position of the intake throttle valve or an external mass flow sensor; and
    - (c) a fuel injector driver circuit which based on at least the air mass flow signal provides a fuel injector output signal to cause the fuel injector to open at a selected period during an engine cycle and for a duration necessary to inject a charge of fuel in proportion to the intake air charge mass.

* * * * *

UNITED STATES PATENT AND TRADEMARK OFFICE
CERTIFICATE OF CORRECTION

PATENT NO. : 7,225,793 B2
APPLICATION NO. : 11/276086
DATED : June 5, 2007
INVENTOR(S) : Kyle E.E. Schwulst et al.

It is certified that error appears in the above-identified patent and that said Letters Patent is hereby corrected as shown below:

Column 17, Line 16, Claim 2:

Delete "an" and insert -- a --.

Column 17, Line 17, Claim 2:

Delete "to" (first instance).

Column 17, Line 32, Claim 5:

After "function" insert -- of --.

Column 17, Line 36, Claim 5:

Delete "an" and insert -- a --.

Column 17, Line 41, Claim 6:

Delete "in" and insert -- an --.

Column 17, Line 50, Claim 8:

Delete "an" (second instance) and insert -- and --.

UNITED STATES PATENT AND TRADEMARK OFFICE
CERTIFICATE OF CORRECTION

PATENT NO.         : 7,225,793 B2
APPLICATION NO. : 11/276086
DATED                  : June 5, 2007
INVENTOR(S)         : Kyle E.E. Schwulst et al.

It is certified that error appears in the above-identified patent and that said Letters Patent is hereby corrected as shown below:

Column 18, Line 3, Claim 12:

Delete "a" and insert -- an --.

Column 18, Line 31, Claim 12:

Delete "in" and insert -- an --.

Column 18, Line 48, Claim 14:

Delete "an" and insert -- a --.

Column 18, Line 49, Claim 14:

Delete "to" (first instance).

Column 18, Line 58, Claim 16:

Delete "an" and insert -- and --.

Column 19, Line 29, Claim 19:

After "reference" insert -- to --.

UNITED STATES PATENT AND TRADEMARK OFFICE
CERTIFICATE OF CORRECTION

PATENT NO. : 7,225,793 B2
APPLICATION NO. : 11/276086
DATED : June 5, 2007
INVENTOR(S) : Kyle E.E. Schwulst et al.

It is certified that error appears in the above-identified patent and that said Letters Patent is hereby corrected as shown below:

Column 19, Line 58, Claim 22:

After "bridge" delete "to".

Column 20, Line 19, Claim 23:

After "reference" insert -- to --.

Signed and Sealed this

First Day of January, 2008

JON W. DUDAS
*Director of the United States Patent and Trademark Office*